(12) United States Patent
Liu et al.

(10) Patent No.: US 12,069,765 B2
(45) Date of Patent: Aug. 20, 2024

(54) NEIGHBOR AWARENESS NETWORKING DATAPATH—RECIPROCATION AND COEXISTENCE

(71) Applicant: Apple Inc., Cupertino, CA (US)

(72) Inventors: Yong Liu, Campbell, CA (US); Christiaan A. Hartman, Mountain View, CA (US); Daniel R. Borges, San Francisco, CA (US); Peter N. Heerboth, San Jose, CA (US); Lawrie Kurian, San Jose, CA (US); Su Khiong Yong, Palo Alto, CA (US); Anand Rajagopalan, Saratoga, CA (US); Saravanan Balasubramaniyan, Los Gatos, CA (US); Tashbeeb Haque, San Francisco, CA (US); Andreas Wolf, San Mateo, CA (US); Guoqing Li, Cupertino, CA (US); Lilach Zukerman, Pardesia (IL)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 16/587,332

(22) Filed: Sep. 30, 2019

(65) Prior Publication Data
US 2020/0029198 A1    Jan. 23, 2020

Related U.S. Application Data

(62) Division of application No. 15/051,640, filed on Feb. 23, 2016, now Pat. No. 10,455,401.
(Continued)

(51) Int. Cl.
*H04W 8/00*    (2009.01)
*H04L 12/18*   (2006.01)
(Continued)

(52) U.S. Cl.
CPC ............ *H04W 8/005* (2013.01); *H04L 12/189* (2013.01); *H04W 4/06* (2013.01); *H04W 4/08* (2013.01);
(Continued)

(58) Field of Classification Search
CPC ... H04W 80/02; H04W 84/18; H04W 40/244; H04W 84/12; H04W 8/005
See application file for complete search history.

(56) References Cited

U.S. PATENT DOCUMENTS 8,239,452 B2 *  8/2012  Moore .................... H04L 67/52
                                                 709/224
8,995,326 B2    3/2015  Gong
(Continued)

FOREIGN PATENT DOCUMENTS

CN    1669341 A      9/2005
CN    101141488      3/2008
(Continued)

OTHER PUBLICATIONS

International Search Report and Written Opinion, May 27, 2016, pp. 1-11.
(Continued)

*Primary Examiner* — Marcus Smith
*Assistant Examiner* — Berhanu D Belete
(74) *Attorney, Agent, or Firm* — Kowert, Hood, Munyon, Rankin & Goetzel, P.C.

(57) ABSTRACT

One or more wireless stations operate to configure Neighbor Awareness Networking (NAN)—direct communication with neighboring wireless stations, i.e., direct communication between the wireless stations without utilizing an intermediate access point. Embodiments of the disclosure relate to reciprocating service between two or more wireless stations. The reciprocating service embodiments described herein
(Continued)

provide a mechanism through which devices can participate in a same service instant.

20 Claims, 9 Drawing Sheets

Related U.S. Application Data

(60) Provisional application No. 62/119,918, filed on Feb. 24, 2015.

(51) Int. Cl.
*H04W 4/06* (2009.01)
*H04W 4/08* (2009.01)
*H04W 4/80* (2018.01)
*H04W 74/00* (2009.01)
*H04W 76/14* (2018.01)
*H04W 72/30* (2023.01)

(52) U.S. Cl.
CPC .............. *H04W 4/80* (2018.02); *H04W 76/14* (2018.02); *H04W 72/30* (2023.01); *H04W 74/002* (2013.01)

(56) References Cited

U.S. PATENT DOCUMENTS

| | | | |
|---|---|---|---|
| 9,143,979 B1 | 9/2015 | Lambert | |
| 9,319,862 B2 | 4/2016 | Kelleman | |
| 9,544,754 B1 | 1/2017 | Lambert | |
| 9,723,513 B1* | 8/2017 | Lambert | H04W 74/085 |
| 9,961,612 B2* | 5/2018 | Kim | H04L 45/20 |
| 2006/0171403 A1 | 8/2006 | Kim | |
| 2007/0207727 A1 | 9/2007 | Song | |
| 2008/0005306 A1 | 1/2008 | Kushalnagar | |
| 2008/0285507 A1 | 11/2008 | Muhkerjee | |
| 2009/0164583 A1 | 6/2009 | Zhu | |
| 2009/0319663 A1* | 12/2009 | Giles | H04L 69/24 709/226 |
| 2010/0165896 A1 | 7/2010 | Gong | |
| 2010/0165963 A1 | 7/2010 | Chu | |
| 2010/0226342 A1 | 9/2010 | Colling | |
| 2011/0029659 A1 | 2/2011 | Shah | |
| 2011/0072055 A1* | 3/2011 | Swaminathan | H04L 67/51 707/810 |
| 2011/0082939 A1 | 4/2011 | Montemurro | |
| 2011/0124282 A1 | 5/2011 | Lee | |
| 2013/0034020 A1 | 2/2013 | Morgan | |
| 2013/0103814 A1* | 4/2013 | Carrasco | H04L 65/4015 709/231 |
| 2013/0148566 A1 | 6/2013 | Doppler | |
| 2013/0203413 A1* | 8/2013 | Lambert | H04L 67/51 455/435.1 |
| 2013/0322297 A1 | 12/2013 | Dominguez | |
| 2014/0056248 A1 | 2/2014 | Wang | |
| 2014/0067702 A1 | 3/2014 | Rathod | |
| 2014/0111312 A1* | 4/2014 | Kim | H04L 67/51 340/10.32 |
| 2014/0112222 A1* | 4/2014 | Park | H04W 52/0235 370/312 |
| 2014/0115060 A1 | 4/2014 | Kim | |
| 2014/0115149 A1* | 4/2014 | Kim | H04W 4/08 709/224 |
| 2014/0177510 A1 | 6/2014 | Tajima | |
| 2014/0198724 A1 | 7/2014 | Abraham | |
| 2014/0254569 A1 | 9/2014 | Abraham | |
| 2014/0269555 A1 | 9/2014 | Sadasivam | |
| 2014/0301190 A1 | 10/2014 | Abraham | |
| 2014/0313966 A1 | 10/2014 | Shukla | |
| 2014/0313967 A1 | 10/2014 | Cha | |
| 2014/0321317 A1 | 10/2014 | Kasslin | |
| 2014/0323110 A1 | 10/2014 | Moon | |
| 2014/0328168 A1 | 11/2014 | Park | |
| 2014/0341073 A1* | 11/2014 | Abraham | H04W 8/005 370/254 |
| 2014/0357269 A1 | 12/2014 | Zhou | |
| 2015/0006633 A1 | 1/2015 | Vandwalle | |
| 2015/0036540 A1 | 2/2015 | Kasslin | |
| 2015/0071121 A1 | 3/2015 | Patil | |
| 2015/0081840 A1 | 3/2015 | Patil | |
| 2015/0098388 A1 | 4/2015 | Fang | |
| 2015/0109961 A1 | 4/2015 | Patil | |
| 2015/0109981 A1 | 4/2015 | Patil | |
| 2015/0172757 A1 | 6/2015 | Kafle | |
| 2015/0200811 A1* | 7/2015 | Kasslin | H04L 41/0853 370/254 |
| 2015/0208455 A1 | 7/2015 | Yen | |
| 2015/0256992 A1 | 9/2015 | Kelleman | |
| 2015/0282149 A1 | 10/2015 | Abraham | |
| 2015/0296458 A1 | 10/2015 | Abraham | |
| 2015/0319029 A1 | 11/2015 | Abraham | |
| 2015/0319235 A1 | 11/2015 | Liu | |
| 2015/0319675 A1 | 11/2015 | Duong | |
| 2015/0341447 A1 | 11/2015 | Patil | |
| 2015/0341811 A1 | 11/2015 | Deshpande | |
| 2015/0350866 A1* | 12/2015 | Patil | H04W 40/244 370/254 |
| 2015/0351146 A1 | 12/2015 | Lee | |
| 2016/0014669 A1 | 1/2016 | Patil | |
| 2016/0014714 A1 | 1/2016 | Patil | |
| 2016/0014715 A1 | 1/2016 | Patil | |
| 2016/0029403 A1 | 1/2016 | Roy | |
| 2016/0057237 A1* | 2/2016 | Yang | H04L 63/123 709/224 |
| 2016/0073288 A1 | 3/2016 | Patil | |
| 2016/0073330 A1 | 3/2016 | Patil | |
| 2016/0088611 A1 | 3/2016 | Patil | |
| 2016/0127459 A1 | 5/2016 | Qi | |
| 2016/0157089 A1 | 6/2016 | Qi | |
| 2016/0165653 A1 | 6/2016 | Liu | |
| 2016/0174225 A1 | 6/2016 | Patil | |
| 2016/0205616 A1* | 7/2016 | Oren | H04W 4/08 370/254 |
| 2016/0226928 A1* | 8/2016 | Park | H04L 67/61 |
| 2016/0241433 A1 | 8/2016 | Huang | |
| 2016/0249200 A1 | 8/2016 | Liu | |
| 2016/0286572 A1 | 9/2016 | Abraham | |
| 2016/0309496 A1 | 10/2016 | Huang | |
| 2016/0337836 A1 | 11/2016 | Kim | |
| 2016/0374107 A1 | 12/2016 | Das | |
| 2017/0034769 A1 | 2/2017 | Kim | |
| 2017/0111772 A1* | 4/2017 | Qi | H04W 72/0446 |
| 2017/0127342 A1* | 5/2017 | Park | H04W 40/244 |
| 2017/0223485 A1* | 8/2017 | Abraham | H04W 4/08 |
| 2017/0223486 A1* | 8/2017 | Abraham | H04L 61/2592 |
| 2017/0346673 A1* | 11/2017 | Kneckt | H04L 67/61 |
| 2017/0359819 A1 | 12/2017 | Wang | |
| 2018/0014164 A1* | 1/2018 | Chen | H04W 4/08 |

FOREIGN PATENT DOCUMENTS

| | | | |
|---|---|---|---|
| CN | 101150396 A | 3/2008 | |
| CN | 101369923 A | 2/2009 | |
| CN | 101682629 A | 3/2010 | |
| CN | 103259907 | 8/2013 | |
| EP | 3249976 | 2/2015 | |
| EP | 3 086 610 A1 | 10/2016 | |
| WO | WO 2014/124251 A1 | 8/2014 | |
| WO | WO-2014186593 A1 * | 11/2014 | ............ H04W 48/14 |
| WO | WO 2016/007779 A1 | 1/2016 | |
| WO | WO 2016/094446 A1 | 6/2016 | |
| WO | WO 2016/154199 A1 | 9/2016 | |

OTHER PUBLICATIONS

Camps-Mur, "Enabling Always on Service Discovery: WiFi Neighbor Awareness Networking", Apr. 29, 2015, 8 pages, vol. 22, Issue 2, IEEE Wireless Communications.

Communication pursuant to Article 94(3) EPC, European Patent application 15816336.0, mailed May 28, 2019, 14 pages.

(56) References Cited

OTHER PUBLICATIONS

Invitation to Pay Additional Fees, International Application No. PCT/US2015/064421, mailed Feb. 22, 2016, 7 pages.
Office Action, Chinese Application for Invention No. 201580064406.9, mailed Sep. 4, 2019, six pages.
Notice of Allowance for CN Application 201680011818.0, dated Mar. 16, 2021, 4 pages.
Office Action for DE Patent Application No. 11 2016 000 890.2; Aug. 29, 2023.

* cited by examiner

NEIGHBOR AWARENESS NETWORKING DATAPATH—RECIPROCATION AND COEXISTENCE

PRIORITY DATA

This application is a divisional application of U.S. patent application Ser. No. 15/051,640, titled "Neighbor Awareness Networking Datapath", filed Feb. 23, 2015 and which claims benefit of priority to U.S. Provisional Application Ser. No. 62/119,918, titled "Neighbor Awareness Networking Datapath", filed Feb. 24, 2015, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "wireless stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and method of reciprocating service between peer devices.

One embodiment relates to a wireless station that includes one or more antennas, one or more radios, and one or more processors coupled to the radios. At least one radio is configured to perform Wi-Fi communications. The wireless station may perform voice and/or data communications, as well as the methods described herein.

In one set of embodiments, one or more wireless stations operate to configure Neighbor Awareness Networking (NAN)—direct communication with neighboring wireless stations, i.e., direct communication between the wireless stations without utilizing an intermediate access point. Embodiments of the disclosure relate to reciprocating service between two or more wireless stations. The reciprocating service embodiments described herein provide a mechanism through which devices can participate in a same service instant. The reciprocating service embodiments described herein provide a mechanism for multicast communication between wireless stations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
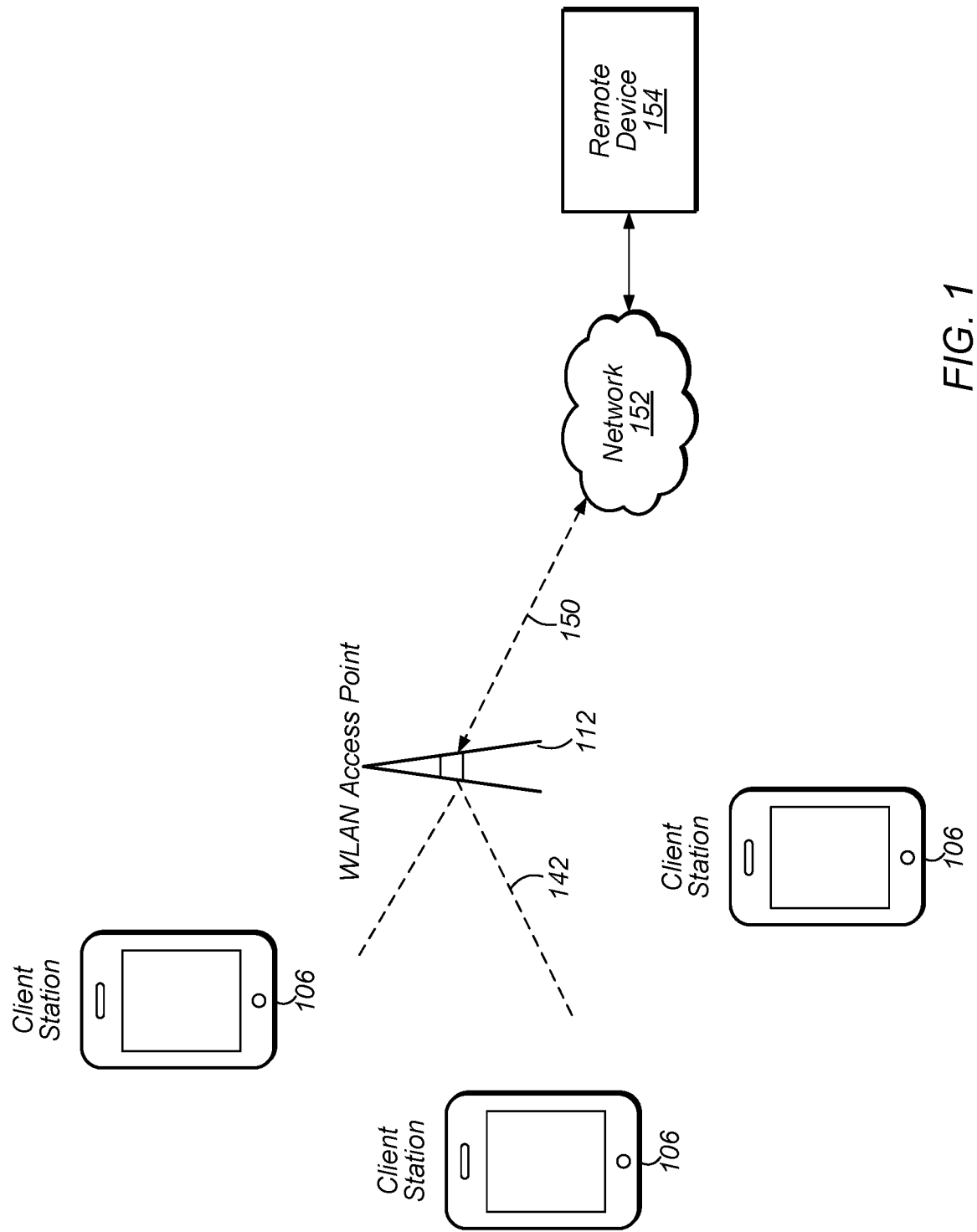
FIG. 1 illustrates an example WLAN system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (i.e., peer NAN devices). Note that the peer devices may be in a common (i.e., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked (i.e., in communication) via one or more NAN data links. Note that a peer wireless station may be a member of more than one NAN cluster.

NAN data cluster (NDC)—refers to a set of peer wireless stations in a common (i.e., same) NAN cluster that share a common base schedule (e.g., a NAN data cluster base schedule). In addition, peer wireless stations in a NAN data cluster may share at least one NAN data link with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (i.e., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one mobile device 106 is configured to communicate directly with one or more neighboring mobile devices, without use of the access point 112.

Figure 2:
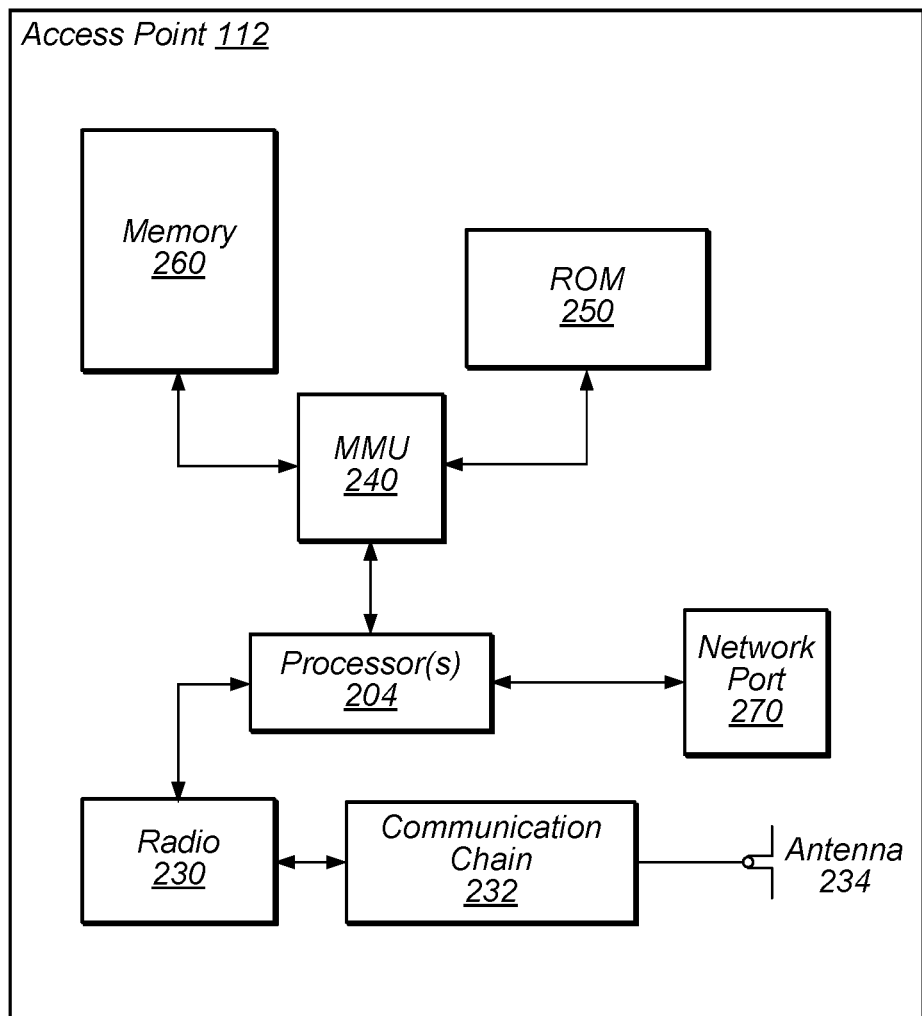
FIG. 2 illustrates a block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230. The antenna 234 communicates with the wireless communication circuitry 230 via communication chain 232. Communication chain 232 may comprise one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Figure 3:
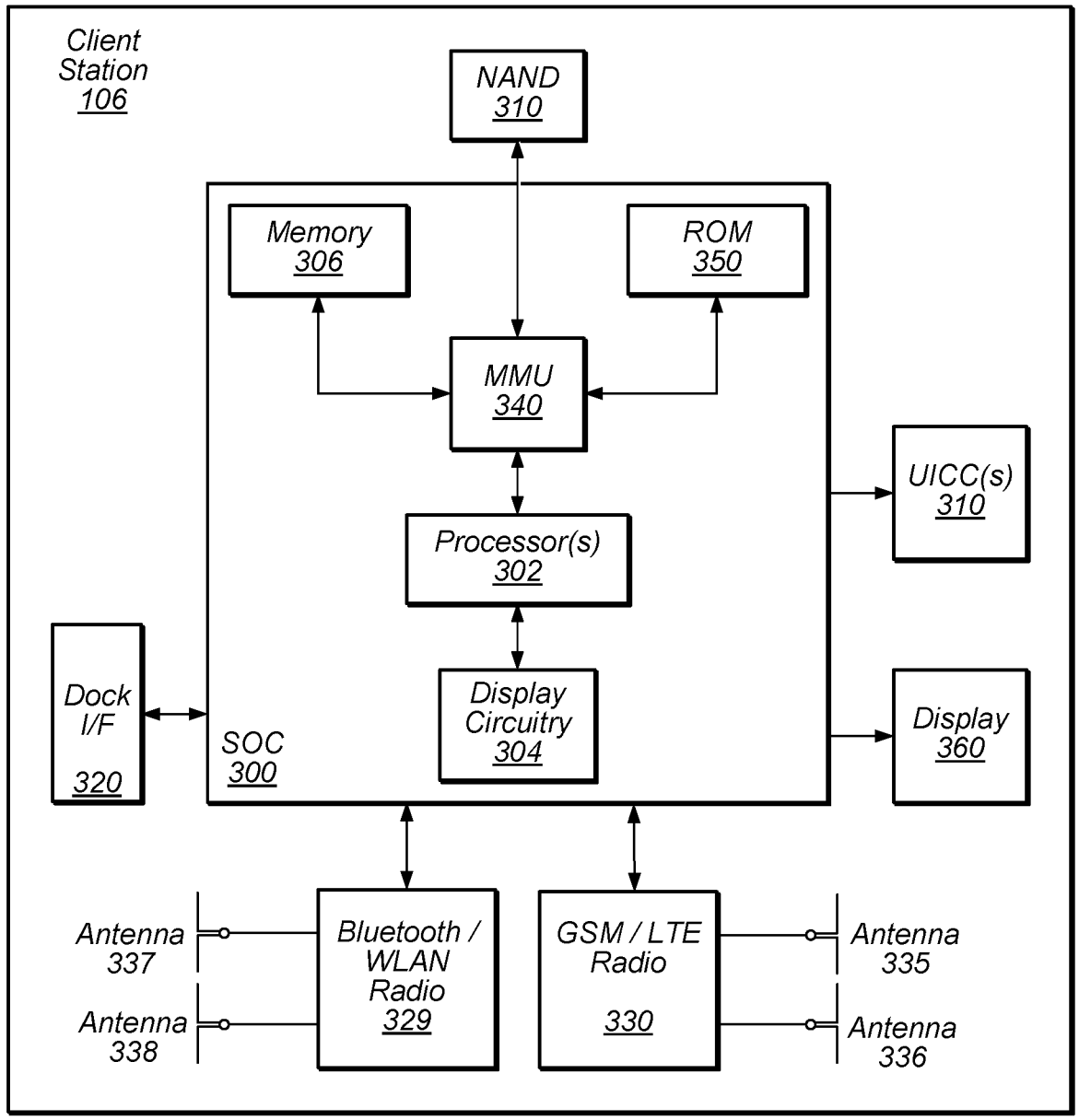
FIG. 3 illustrates an example simplified block diagram of a client station (UE), according to some embodiments.

FIG. 3—Client Station Block Diagram

FIG. 3 illustrates an example simplified block diagram of a client station 106. According to embodiments, client station 106 may be a user equipment device (UE), a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further comprise one or more smart cards 310 that comprise SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may comprise multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the client station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each be comprised of one or more processing elements. In other words, one or more processing elements may be included in cellular communication circuitry 330 and short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer-to-peer manner, i.e., without the communications going through an access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, i.e., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability.

The NAN protocol essentially has two aspects: 1) synchronization and discovery (NAN 1.0) and 2) datapath transmission (NAN 2.0). NAN 1.0 describes methods for NAN protocol synchronization and discovery. As disclosed in U.S. patent application Ser. No. 14/960,488, after two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication.

Embodiments described herein further define methods for a group of wireless stations to participate in common service instances in which each wireless station in the group of wireless stations may serve as both a service provider and a service consumer.

In addition, embodiments described herein further define methods for improving communications between peer devices during a coexistence event, such as sharing a single antenna of a mobile device for communications according to multiple radio access technologies (RATs).

Reciprocating Services

In some embodiments, a reciprocating (RECIP) service group may be defined as a group of devices participating in a service instance. In other words, the service instance may be common to, or the same for, all devices participating in the RECIP service group. Each device may serve as both a service provider and a service consumer. Additionally, in some embodiments, a RECIP service group may allow some devices to participate as service consumers only. In other words, a portion of the devices in a RECIP service group may only receive, or subscribe to, the service instance and may not actively publish the service instance.

In addition, the group of devices may use a single (group) multicast address to reach all neighboring devices that are participating in the service instance (i.e., a same service instance or common service instance). In some embodiments, the single (group) multicast address may be an A3/BSSID (basic service set identification) address used in all frames intended for the RECIP service group participants.

Further, the group of devices may be synchronized and may periodically present at identical service windows for service related activities. In other words, the group of devices may be synchronized tightly (or the group of devices may maintain tight synchronization) such that all devices in the group may present at identical service windows. Note that the service window may be defined by both a time parameter and a channel parameter and that all devices participating in the group may wake-up during the service, or group, window. In other words, the service window may be considered as a generalized negotiation window. Thus, the RECIP service group participants (e.g., the wireless stations participating in the RECIP service group) may establish unicast sessions to transmit data in a peer-to-peer interaction and additionally establish multicast sessions to transmit multicast data to all (or a set of) participants in the RECIP service group (i.e., service neighborhood). Hence, service windows may be utilized as rendezvous periods for all RECIP service group participants to communicate.

For example, during a service window, RECIP service group participants may transmit service management frames, transmit multicast data, announce or check pending data, and/or schedule or adjust additional unicast or multicast transmission windows. Further, a pair of wireless stations may schedule a unicast (peer-to-peer) transmission channel/time window sequence (in addition to service windows), based on both wireless stations' further availability preferences. For example, during a teleconference a subset of the group participants may setup a datapath for communication between the subset. Additionally, a multicast source may schedule a multicast transmission channel/time window sequence (in addition to service windows) based on its own further availability preference and such a schedule may allow for a first subset of group participants to communicate within the subset whereas a second subset of group participants (not included in the first subset) may conserve power (sleep) outside of the service window.

Service Instance Participation

There are at least two options for forming a RECIP service group. In a first option, a service may direct one or more devices (e.g., wireless stations) to publish a service instance (i.e., a common service instance or a same service instance). Then, when devices that publish the service instance discover each other (e.g., meet in a neighborhood), the devices may form a RECIP service group or merge into a previously formed (i.e., bigger or larger) RECIP group. Note that in such a scheme, a RECIP service group, whether newly formed or previously formed (i.e., being reformed via addition of new members), may use a common (group) multicast address and maintain a common (group) service window as described above. Hence, in some embodiments, the common (group) multicast address and common (group) service window schedule may be set by the service instance or may be derived from service instance information such as, a hash of service instance name, which may ensure that these parameters (multicast address and common service window schedule) may be among devices and among merging groups.

In a second option, a founder (or first device, e.g., a first wireless station) may start and subsequently publish a service instance. Thus, the founder may select a common (group) multicast address and may set a common (group) service window schedule. Then, other devices may browse for available service instances and may select a desired service instance to participate in. Further, after a device participated in the service instance, the device may also publish the service instance to other devices in order to collect other devices into the RECIP service group.

In either of the above described options, it may be desirable to limit the number of RECIP service group participants that publish the service instance in the common discovery window in order to limit traffic during the discovery window. Thus, in embodiments in which the service instance is published without being solicited (i.e., unsolicited publish), a participant in the RECIP service group may cancel its transmission of the service instance in the discovery window if it receives the service instances from another participant. In other words, the participant may cancel its publishing frame transmission if it receives a publishing frame from another participant. In certain embodiments, this may only occur if the publishing frame has a frame signal strength higher than a threshold. Additionally, once the participant discovers the service instance within the discovery window, the participant may use service windows to republish the service instance and establish session connections with existing service participants. Further, if the participant is a service consumer only, the participant may transmit active subscription frames during service windows in order to subscribe to existing service providers/publishers within the RECIP service group.

In addition, in embodiments in which the service instance is only published when solicited (i.e., solicited publish), a RECIP service group may limit publishing traffic by requesting existing participants to perform a solicited publish only during discovery windows while requesting new participants to perform an active subscription during discovery windows. Further, in order to facilitate RECIP group merging for a common service instance, existing participants may perform an unsolicited publish during service windows and, in addition, may use signal strength based suppression to reduce publishing traffic. In some embodiments, once a participant discovers the service instance within a discovery window, the participant may continue using an active subscription to discover existing participants during service windows and establish session connections within the RECIP service group.

RECIP Service Group Security

In addition to facilitating discovery and merger of RECIP service groups, embodiments disclosed herein may also provide various levels of security for participants within a RECIP service group ranging from no security to application level security. Thus, in some embodiments, to reduce traffic and avoid N×N (where N is a number of participants within a RECIP service group) security association handshakes among service participants, the RECIP service group may not provide any security. In other words, the RECIP service group may not require any security. Alternatively, the RECIP service group may provide a shared group credential or shared group key. In such embodiments, new participants may conduct a one-time security association handshake with any existing RECIP service group participant in order to obtain the shared group credential/key. Additionally, the shared group credential/key may also be obtained from an application layer. For example, via user input or pre-installation via an application server. Once obtained, the shared group credential/key may also be used for multicast transmissions from all RECIP service group participants and/or unicast transmissions between RECIP service group participants.

In some embodiments, individual multicast keys and unicast keys may be used by the RECIP service group. Thus, each multicast source may create and use its own multicast key which may allow for enhanced privacy and security protection as compared to the above embodiments. However, the source may need to securely deliver the multicast key to each intended sink (consumer of the service). For additional security, in some embodiments, each participant in the RECIP service group may create and use a pairwise key with each intended peer. In such embodiments, each pairwise key may be shared via a security association handshake. In other words, a security association handshake may be conducted for each peer-to-peer association in order to share the pairwise key.

In some embodiments, application layer, instead of MAC level, security may be relied upon. In such embodiments, the MAC may help establish datapath control sessions between each device pair to conduct an application level security association, including key generation and delivery. Note that the application layer may have more resources (e.g., memory) to maintain larger amounts of security keys for a large and dense group.

Multicast Session Setup

As described above, one or more devices (wireless stations) may participate in a RECIP service group. At least one of the devices may be a multicast source and may transmit multicast data to the RECIP service group. In some embodiments, in order to start, or initiate, a multicast session, the at least one device (i.e., the at least one multicast source) may start a RECIP service group centric multicast session. In the RECIP service group centric multicast session, all multicast sources may only use a service multicast address. Additionally, all multicast sources may use a common service group security policy. For example, if the RECIP service group chooses to use a shared group key, all multicast sources may only use the shared group key for security association and protected data transmissions.

In some embodiments, in order to start, or initiate, a multicast session, the at least one device may start a source centric multicast session. In such embodiments, the at least one device (i.e., the at least one multicast source) may use a multicast address different from a service multicast address. For example, the at least one device may limit the sinks (consumers of a service) to a subset of the RECIP service group participants. Additionally, the at least one device may use a security policy different from the RECIP service group security policy. In some embodiments, the at least one device may only use a higher security level than the RECIP service group security level. For example, the RECIP service group may use a shared group key while the at least one device may use its own multicast key for enhanced security protection as compared to the group key.

In addition to initiating the multicast session, a multicast source (i.e., the at least one device) may define and announce the one or more multicast session parameters such as a multicast schedule, a multicast type, a multicast address (if different than the RECIP service group multicast address), and a multicast security policy (if different than the RECIP service group security policy). The multicast schedule may specify a channel and time window sequence that may be defined by the multicast source to transmit multicast data, in addition to service windows. Note that all RECIP group service participants may need to be present in service windows. Therefore, service windows may be used by multicast sources to transmit multicast data. However, if service windows are not sufficient for a multicast source to complete all multicast transmissions, the multicast source may schedule additional time windows (on desired channels) to transmit multicast data via the multicast schedule parameter. Additionally, a sink (consumer) subscribing to the multicast source may need to follow the multicast schedule to ensure receipt of all multicast data transmitted by the multicast source. Note that the multicast source may allow sinks to suggest a different multicast schedule (including time windows and channels), however, the multicast source may decide the multicast schedule. Thus, the multicast source may accept a partial suggestion (such as the channels, but not time windows) and change its current multicast schedule accordingly.

The multicast type parameter may be used by the multicast source to specify whether the multicast is open or controlled. In an open multicast, the multicast source may not maintain sink (consumer) membership and may not require sinks to subscribe to the source explicitly. Thus, once a sink obtains multicast session parameters, the sink may choose to participate in the multicast session by adopting the multicast address and following the multicast schedule without registering with the multicast source. On the other hand, in a controlled multicast, the multicast source may maintain sink membership and may require each intended sink to subscribe to the source explicitly. Note that if the sink membership is managed at the MAC level, the sink may register its MAC data interface address at the source. Additionally, if the sink membership is managed at an upper layer (e.g., at the application layer), the MAC layer may help establish a multicast control session for each intended sink and then may pass the multicast control to the upper layer.

Figure 4A:
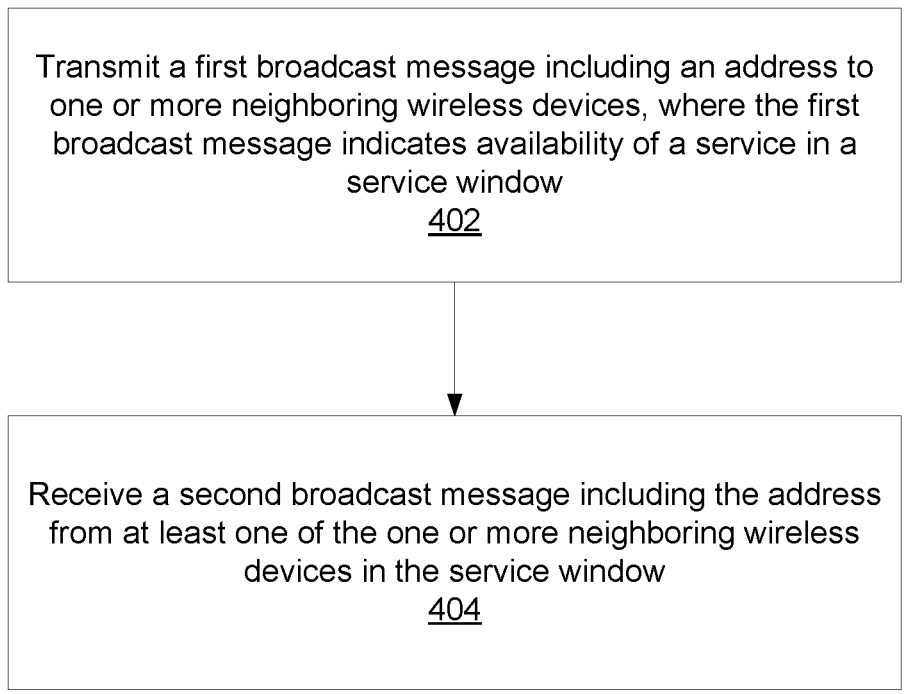
FIG. 4A illustrates a method for transmitting a multicast address and service window, according to some embodiments.

FIG. 4A illustrates a method for transmitting a multicast address and service window, according to some embodiments. The method shown in FIG. 4A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 402, a first broadcast message may be transmitted from a wireless station (devices), such as client station 106, to one or more neighboring wireless stations (or devices). The first broadcast message may include an address for a multicast broadcast. In some embodiments, the address may be a multicast address. In addition, the first broadcast message may indicate an availability of a service in a service window. In some embodiments, the service window may be defined by one or more of a time parameter and a channel parameter.

At 404, the wireless station may receive a second broadcast message from at least one of the neighboring wireless stations. The second broadcast may include the address transmitted in the first broadcast message. In addition, the second broadcast message may be received in the service window.

In some embodiments, the wireless station may transmit a third broadcast message to the neighboring wireless stations. The third broadcast message may include the address from the first broadcast message and may also include a schedule of broadcast transmissions outside the service window. In other words, the broadcast transmissions may occur at a different time and/or on a different channel than the service window (e.g., may be defined by a time parameter and/or a channel parameter where the time parameter and/or channel parameter is different than a time parameter and/or channel parameter that defines the service window). In some embodiments, the third broadcast message may include a schedule of broadcast transmissions outside the service window for a subset of the neighboring wireless stations. In other words, a subset of the neighboring wireless stations may meet (or present) on a schedule outside of the service window to receive broadcast transmissions from the wireless station.

In some embodiments, the wireless station may transmit a first message to a first neighboring wireless station of the neighboring wireless stations. The first message may include a request for further communications with the first neighboring wireless station outside the service window. In addition, the wireless station may transmit a second message to the first neighboring wireless device outside the service window.

Figure 4B:
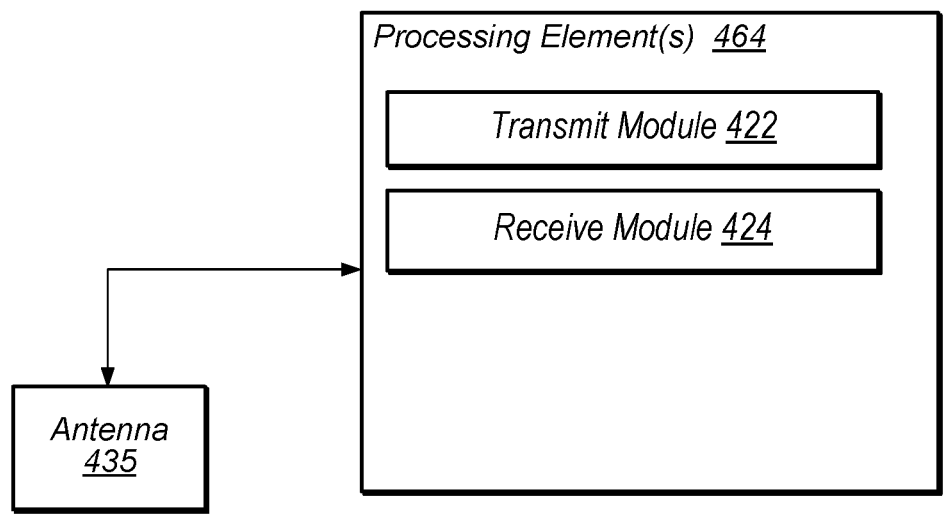
FIG. 4B illustrates a processing element including modules for transmitting a multicast address and service window, according to some embodiments.

FIG. 4B illustrates a processing element including modules for transmitting a multicast address and service window, according to some embodiments. In some embodiments, antenna 435 may be coupled to processing element 464. The processing element may be configured to perform the method described above in reference to FIG. 4A. In some embodiments, processing element 464 may include one or more modules, such as modules (or circuitry) 422 and 424, and the modules (or circuitry) may be configured to perform various steps of the method described above in reference to FIG. 4A. In some embodiments, the processing element may be included in a wireless station such as wireless station 106. As shown, the modules may be configured as follows.

In some embodiments, processing element 464 may include a transmit module 422 configured to transmit a first broadcast message to one or more neighboring wireless stations (or devices). The first broadcast message may include an address for a multicast broadcast. In some embodiments, the address may be a multicast address. In addition, the first broadcast message may indicate an availability of a service in a service window. In some embodiments, the service window may be defined by one or more of a time parameter and a channel parameter.

In some embodiments, processing element 464 may include a receive module 424 configured to receive a second broadcast message from at least one of the neighboring wireless stations. The second broadcast may include the address transmitted in the first broadcast message. In addition, the second broadcast message may be received in the service window.

It is apparent for those skilled in the art that, for the particular processes of the modules (or circuitry) described above (such as modules 422 and 424), reference may be made to the corresponding steps (such as steps 402 and 404, respectively) in the related process embodiment sharing the same concept and the reference is regarded as the disclosure of the related modules (or circuitry) as well. Furthermore, processing element 464 may be implemented in software, hardware or combination thereof. More specifically, processing element 464 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 464 may be implemented as a general-purpose processor such as a CPU, and therefore each module can be implemented with the CPU executing instructions stored in a memory which perform a respective step.

Figure 5A:
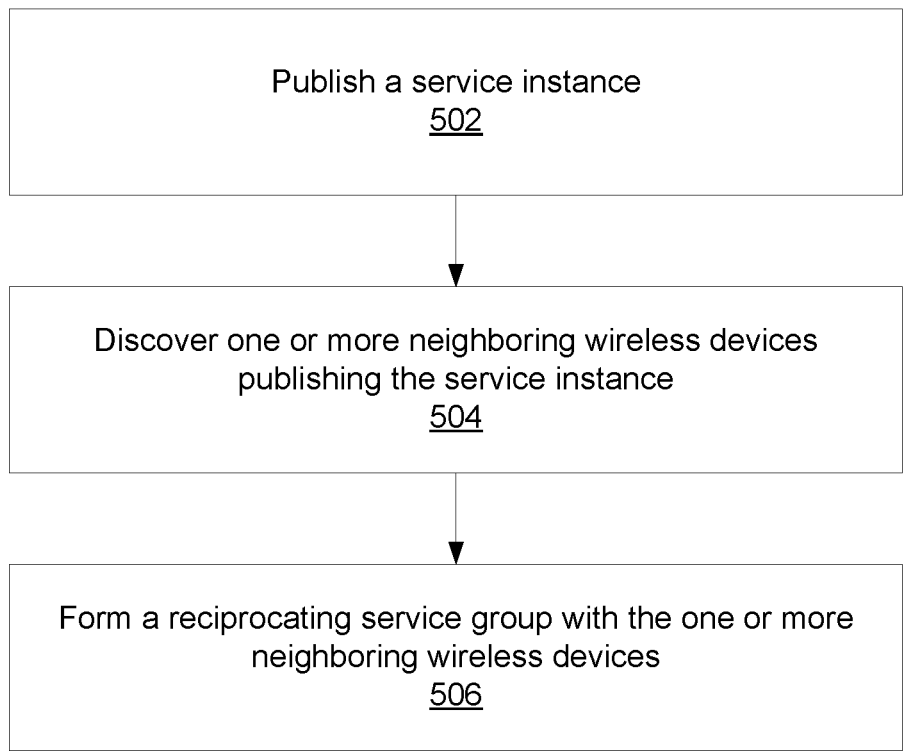
FIG. 5A illustrates a method to form a reciprocating service group, according to some embodiments.

FIG. 5A illustrates a method to form a reciprocating service group, according to some embodiments. The method shown in FIG. 5A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a wireless device (or station), such as client station 106, may publish a service instance. In some embodiments, the wireless device may broadcast a multicast address and a service window to publish the service instance. The service window may be defined by a time and/or channel parameter.

At 504, the wireless device may discover one or more neighboring wireless devices (or stations) publishing the service instance. In other words, the one or more neighboring wireless devices may be publishing the same service instance as the wireless device. In some embodiments, the wireless device may determine that one or more of the neighboring wireless devices are publishing the service instance in a discovery window.

At 506, the wireless device may form a reciprocating service group with the one or more neighboring wireless devices. In some embodiments, to form the reciprocating service group, the wireless device may republish the service instance in a service window and establish session connections with the one or more neighboring wireless devices.

In some embodiments, the wireless device may additionally transmit active subscription frames during service windows to subscribe to existing service providers (e.g., neighboring wireless devices advertising or publishing services) within the reciprocating service group.

In some embodiments, the wireless device may additionally receive, during a discovery window, a publishing frame for the service instance from at least one of the neighboring wireless devices. In response, the wireless device may cancel its publishing of the service instance in the discovery window. In some embodiments, the wireless device may compare received signal strength of the publishing frame to a threshold and cancel its publishing of the service instance if the received signal strength is greater than the threshold.

Figure 5B:
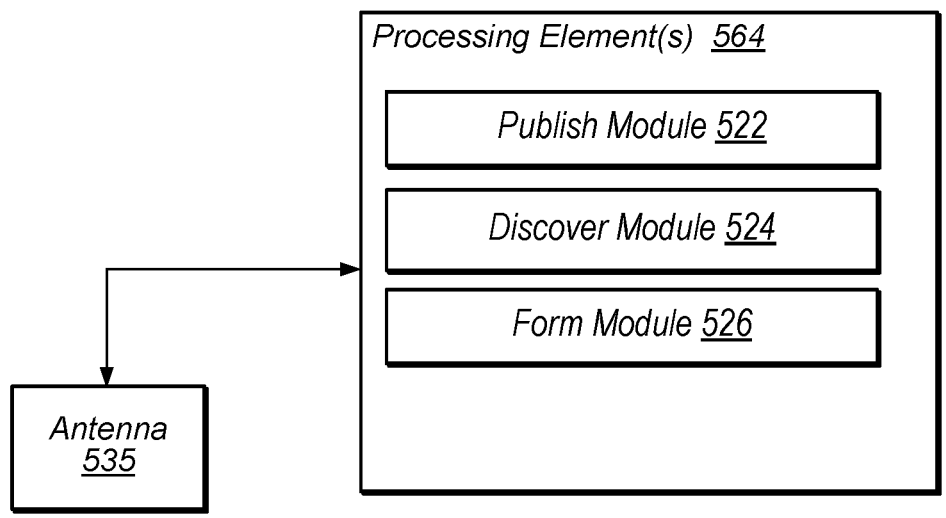
FIG. 5B illustrates a processing element including modules for forming a reciprocating service group, according to some embodiments.

FIG. 5B illustrates a processing element including modules for forming a reciprocating service group, according to some embodiments. In some embodiments, antenna 535 may be coupled to processing element 564. The processing element may be configured to perform the method described above in reference to FIG. 5A. In some embodiments, processing element 564 may include one or more modules, such as modules (or circuitry) 522, 524, and 526, and the modules (or circuitry) may be configured to perform various steps of the method described above in reference to FIG. 5A. In some embodiments, the processing element may be included in a wireless station such as wireless station 106. As shown, the modules may be configured as follows.

In some embodiments, processing element 564 may include a publish module 522 configured to publish a service instance. In some embodiments, the publish module may be configured to broadcast a multicast address and a service window to publish the service instance. The service window may be defined by a time and/or channel parameter.

In some embodiments, processing element 564 may include a discover module 524 configured to discover one or more neighboring wireless devices (or stations) publishing the service instance. In other words, the one or more neighboring wireless devices may be publishing the same service instance as publish module 522. In some embodiments, the discover module may determine that one or more of the neighboring wireless devices are publishing the service instance in a discovery window.

In some embodiments, processing element 564 may include a form module 526 configured to form a reciprocating service group with the one or more neighboring wireless devices. In some embodiments, to form the reciprocating service group, the form module may republish the service instance in a service window and establish session connections with the one or more neighboring wireless devices.

It is apparent for those skilled in the art that, for the particular processes of the modules (or circuitry) described above (such as modules 522, 524, and 526), reference may be made to the corresponding steps (such as steps 502, 504, and 506, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective step.

NAN/AWDL Coexistence

As described above, NAN allows for peer-to-peer communication between wireless stations. Additionally, Apple Wireless Direct Link (AWDL) may also allow for peer-to-peer communication between wireless stations via a Wi-Fi peer-to-peer connection. In either instance, the communications may be performed wirelessly via at least one antenna of a wireless station. In some embodiments, as described above, the at least one antenna may be shared across various radio access technologies (RATs) such as LTE, Bluetooth, Wi-Fi, and global positioning system (GPS). In other words, the RATs may coexist and share a single antenna of the wireless station. Thus, a device (e.g., a wireless station) involved in a peer-to-peer or group multicast may be absent as the antenna is being used by another service. Such an absence during a NAN/AWDL data exchange or multicast may cause significant rate and/or throughput degradation. For example, peer A may have data to send to peer B and peer B may begin to receive data from peer A. However, while peer B is receiving data, peer B may switch the antenna to another RAT (e.g., LTE or Bluetooth). Peer A may continue to send data to peer B because peer A may not be aware that peer B has tuned away to another RAT. Thus, peer A may not be receiving feedback (e.g., acknowledgement) from peer B and in response, may degrade the rate at which data is being sent to peer B. In other words, peer A may misinterpret the lack of feedback from peer B as a channel condition issue and take corrective measures that are not required.

Figure 6:
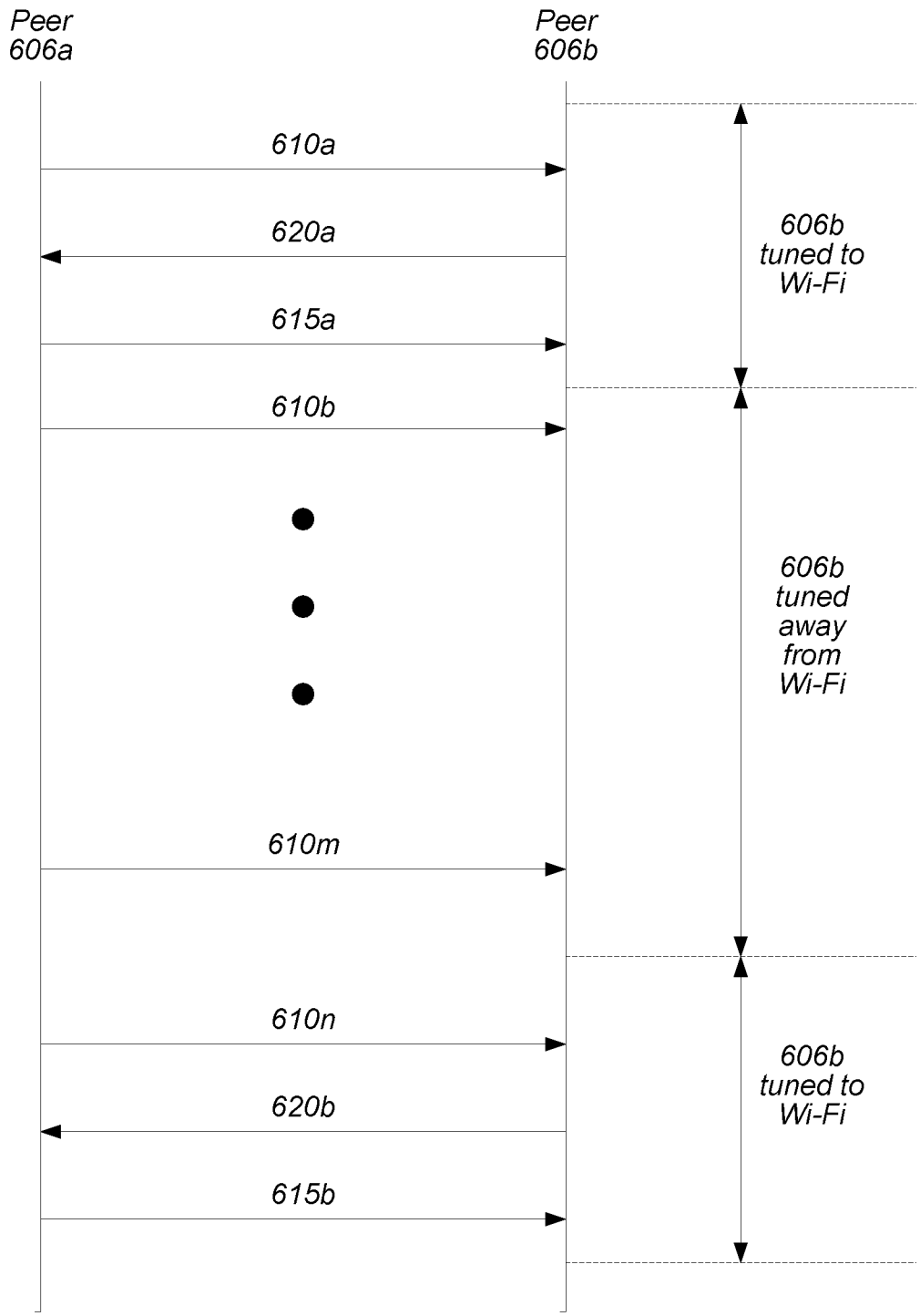
FIG. 6 illustrates a method to improve communications between peer devices during a coexistence event, according to some embodiments.

FIG. 6 illustrates a method to improve communications between peer devices during a coexistence event, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired.

As shown, peer 606a (e.g., a first wireless station, such as client station 106), which has data to send to peer 606b (e.g., a second wireless station), may send a request to send (RTS) message 610a to peer 606b prior to sending a data packet 615a. Note that peer 606b may be in coexistence, but may be tuned to Wi-Fi and receive RTS message 610a from peer 606a. In other words, peer 606b may be sharing an antenna across a plurality of RATs, but may be currently tuned to Wi-Fi to receive communications (data) from peer 606a. In response to RTS message 610a from peer 606a, peer B may send a clear to send (CTS) message 620a to peer 606a. This may indicate to peer 606a that peer 606b may stay in the NAN (or AWDL) role and may be prepared to receive data from peer 606a. Thus, in response to CTS message 620a, peer 606a may send data packet 615a to peer 606b. After receiving data packet 620a, peer 606b may start a coexistence event and tune away from the peer-to-peer communication. During the coexistence event, peer 606a may continue to send RTS messages (610b, . . . 610n) to peer 606b, however, peer 606a may only send another data packet (e.g., 615b) in response to receiving a CTS message (e.g., CTS message 620b) from peer 606b. Thus, during the coexistence event, peer 606b does not send a CTS message to peer 606a and no data is transmitted. Such embodiments may avoid rate degradation during peer 606b's coexistence event.

Figure 7:
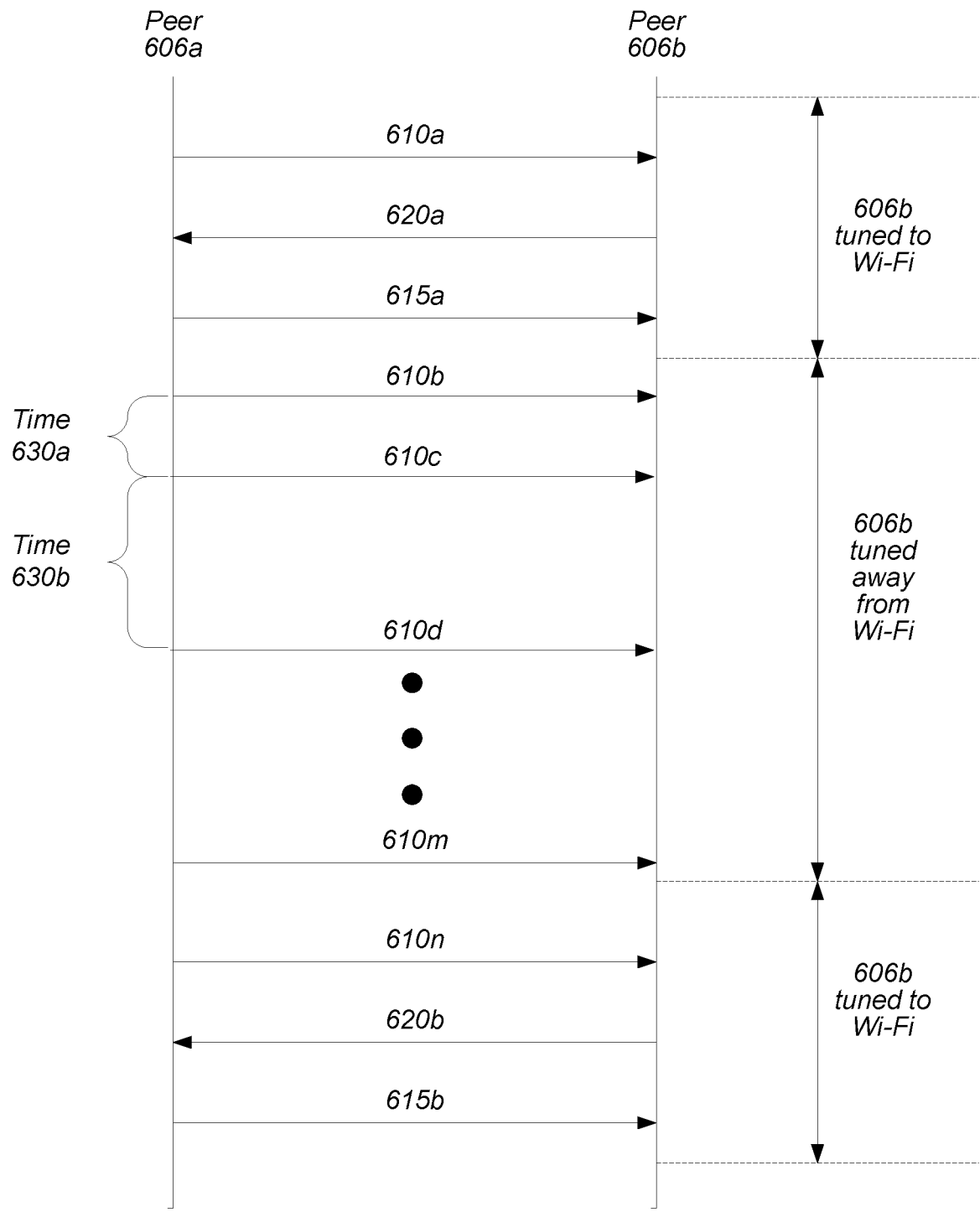
FIG. 7 illustrates backoff time increases according to some embodiments.

However, as illustrated in FIG. 7, each time peer 606a sends an RTS message 610 to peer 606b and does not receive a CTS message 620 from peer 606b, peer 606a may increase a time interval between sending RTS messages 610. This backoff increase (time 630) may continue to increase to a maximum duration and may lead to non-efficient behavior between the peer devices. For example, in some instances, peer 606b may return (e.g., tune back to peer 606a) from a coexistence event and be ready to receive data, however, due to the backoff increase, peer 606a may have paused transmitting and may not immediately transmit an RTS message 610 to peer 606b when peer 606b returns leading to inefficiencies in transmitting data from peer 606a to peer 606b. Additionally, use of the RTS/CTS messaging scheme may mute other stations within a peer group (Wi-Fi, AWDL, or NAN) during the absence of the coexisting peer (e.g., peer 606b) due to the "false" RTS messages. In other words, when peer 606a sends peer 606b an RTS message during peer 606b's coexistence event, all neighbor peer devices may pause transmissions during the RTS network allocation vector (NAV) period.

Hence, to avoid the inefficiencies described above, in some embodiments, a peer device may inform other peer devices of planned coexistence events. In other words, a device which will be absent due to a coexistence event, may update all devices within a cluster of the coexistence event. In some embodiments, the update may be included as a coexistence attribute in the discovery (or beacon) frames which may be transmitted as broadcast frames to the cluster.

Figure 8:
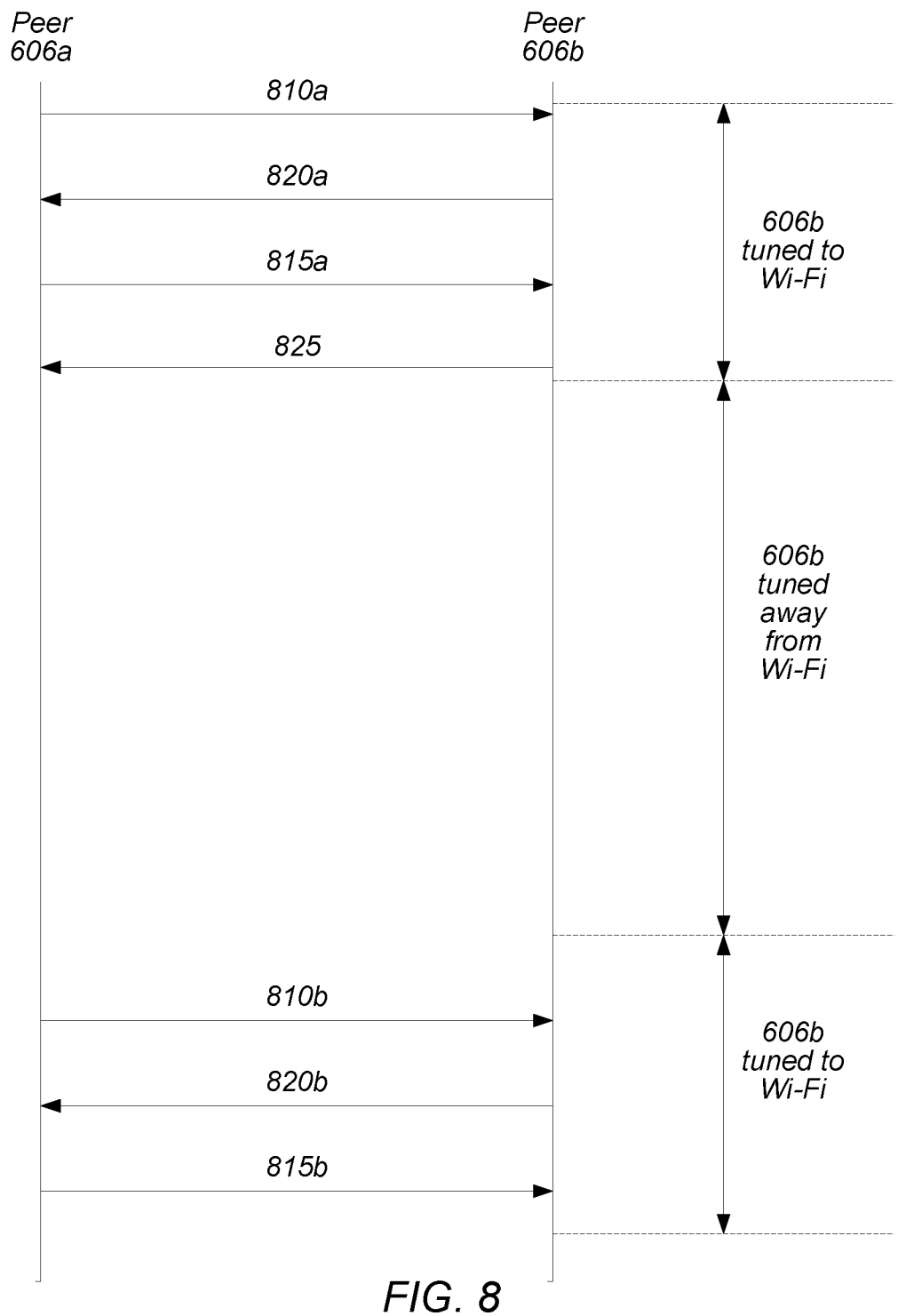
FIG. 8 illustrates a method to improve communications between peer devices during a coexistence event, according to some embodiments.

FIG. 8 illustrates a method to improve communications between peer devices during a coexistence event, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired.

As illustrated in FIG. 8, peer 606a may send an RTS message 810a to peer 606b when peer 606b is present. In response, peer 606b may send a CTS message 820a to peer 606a and peer 606a may respond by transmitting a data packet 815a to peer 606b. Then, peer 606b may update peer 606a of a planned coexistence event (e.g., absence) via a beacon frame 825 with a coexistence attribute. In response, peer 606a may determine, based on beacon frame 825, a time to restart transmission to peer 606b and the time may correspond to the end of the coexistence event. Thus, at the determined time, peer 606a may send another RTS message 810b to peer 606b and in response, receive a CTS message 820b from peer 606b. Then, peer 606a may send another data packet 815b to peer 606b. Hence, transmissions from peer 606a to peer 606b during the coexistence event are avoided. Additionally, aggregation of MAC service data units (MSDUs) and MAC protocol data units (MPDUs) may be avoided.

Note that in some embodiments, an RTS message may be sent on every packet when peer 606b is available (e.g., not tuned away). Further, since the beacon/discovery frames may be transmitted as broadcasts, the coexistence attribute may not be received at every availability/discovery window and peer 606a may not implement time synchronization to peer 606b absent time, thus sending the RTS message may ensure peer 606b is available to receive data. Note further that peers that receive coexistence attributes (e.g., peer 606a) may only save the coexistence attributes for associated peers. Note further that it may be assumed that beacon frames in AWDL/NAN may be transmitted periodically and may be transmitted more than once in a window, hence, once there is a coexistence update, the coexistence attribute may be updated and transmitted.

Figure 9A:
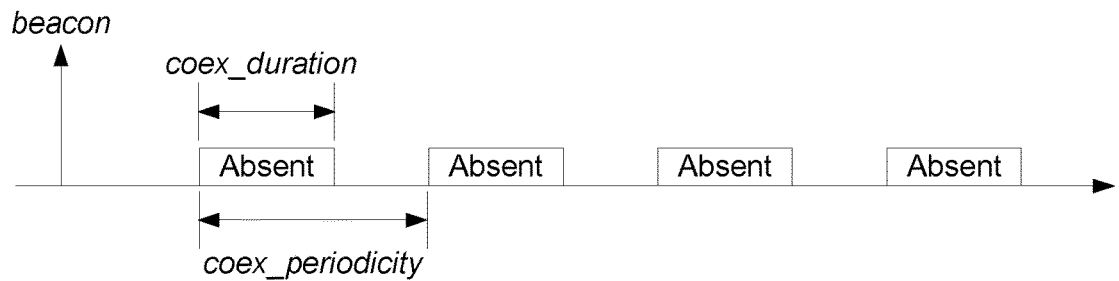
FIG. 9A illustrates a time period of a coex_periodicity parameter according to some embodiments.

The coexistence attribute may include one or more parameters (or fields) describing the coexistence event. Thus, in some embodiments, the parameters may include a combination of a coex_numberreports parameter, a coex_downcoutnertime parameter, a coex_starttime parameter, a coex_duration parameter, a coex_periodicity parameter, and a coex_periodicitycount parameter. The coex_numberreports parameter may indicate a number of coexistence traffic reports included in a particular coexistence attribute and "0" may be used to indicate no coexistence traffic reports in the particular coexistence attribute. The coex_duration, coex_periodicity, coex_periodicitycount parameters may be repeated for every coexistence traffic report. The coex_duration parameter may indicate a duration of an active phase of traffic in micro-seconds as illustrated in FIG. 9A. Thus, as illustrated, after sending a beacon (such as beacon 825 described above), a peer device may enter into a coexistence cycle that may be specified by a one or more parameters such as coex_periodicitycout, coex_duration and coe_preiodicity. The coex_periodicity parameter may indicate a periodicity of traffic in micro-seconds. Additionally, a coex_periodicity value of "0" may be used to indicate aperiodic traffic. The coex_periodicitycount parameter may indicate a number of absent (coexistence) events planned after the beacon or master indication frame (MIF). Note that a value of "1" may indicate non-period activity. In addition, a coex_starttime parameter may indicate a start time for a coexistence event based on common timing of the cluster. Coex_starttime may be indicated in micro-seconds and may be used with NAN peer-to-peer communications. Note that all devices in a NAN cluster may be synchronized to a master clock, thus an indication of the start time in beacon/service discovery frames may be sufficient to describe the timing of the coexistence event.

However, since AWDL clusters may not be synchronized to an absolute clock, a coex_downcountertime parameter may be used to indicate an amount of time in micro-seconds until a start of a next coexistence event. Coex_downcountertime may be indicated in each coexistence traffic report and may be specified relative to a target transmission time of a frame as illustrated in FIG. 9C and further explained below.

Figure 9B:
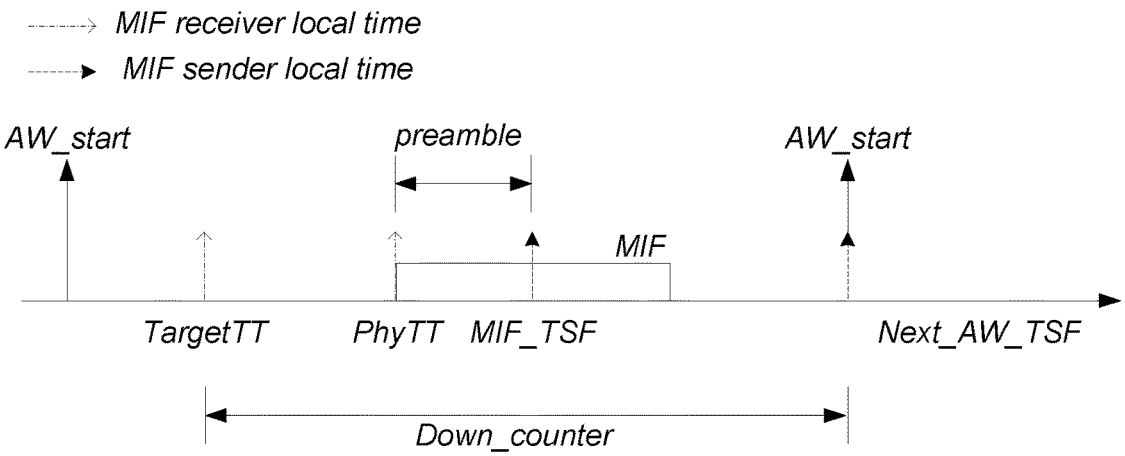
FIG. 9B illustrates a relationship between a prior art AWDL MIF down_counter, a local time at a frame physical transmission time (PhyTT), and a local time at a frame target transmission time (TargetTT).
Figure 9C:
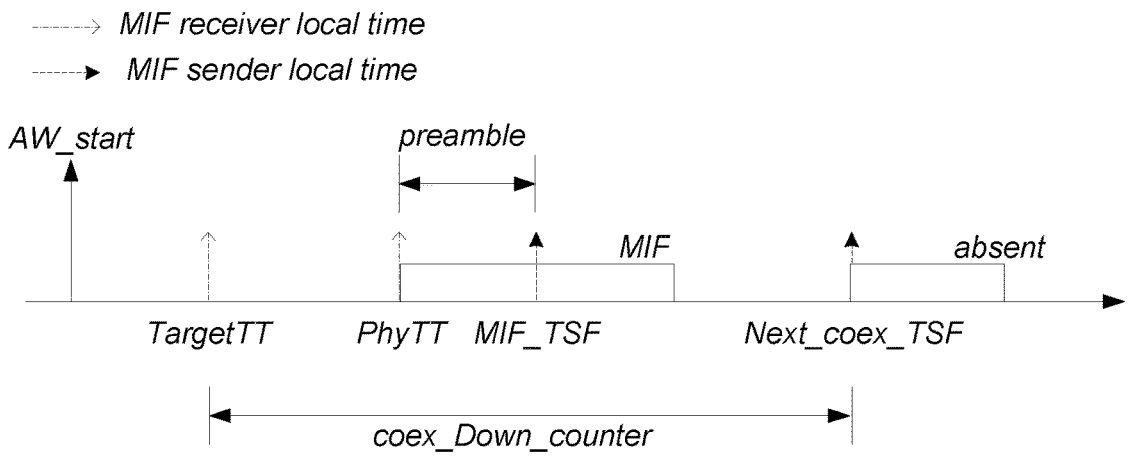
FIG. 9C illustrates a relationship between TargetTT and coex_downcountertime according to some embodiments.

FIG. 9B illustrates the relationship between a prior art AWDL MIF down_counter, a local time at a frame physical transmission time (PhyTT), a local time at a frame target transmission time (TargetTT). The down_counter is the amount of time in time units (TUs) (e.g., milliseconds) until a start time of a next availability window (AW) period relative to the TargetTT. Thus, the start of the next AW, according to a received MIF, may be calculated as:

Time Remaining to AW start=Down_Counter−(PhyTT−TargetTT)

Note that the translation of the remaining time to local TSF is calculated according to the MIF TSF latching (MIF_TSF) and the calculation is performed by the PMAC since the FW does not handle the MIF immediately and the down_counter value should be compensated as:

Next_AW_TSF=Down_Counter−(PhyTT−TargetTT)+MIF_TSF−Preamble_Time

FIG. 7C illustrates a relationship between TargetTT and coex_downcountertime according to some embodiments. Note that in order to avoid real-time update of coex_downcountertime, it may be related to TargetTT Thus, a time remaining until a coexistence event (Next_COEX_TSF) may be calculated similarly to AW start time as:

Time Remaining to coexistence event=coex_downcountertime−(PhyTT−TargetTT)

Additionally, since there may be lag in handling the MIF, the time remaining to coexistence event may also be compensated as:

Next_COEX_TSF=coex_downcountertime−(PhyTT−TargetTT)+MIF_TSF−Preamble_Time

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio configured to perform Wi-Fi communication with a Wi-Fi access point;
   at least one processor coupled to the at least one radio, wherein the wireless station is configured to perform voice and/or data communications;
   wherein the at least one processor is configured to cause the wireless station to:
   publish a service instance;
   discover one or more neighboring wireless stations publishing the service instance;
   form, with the one or more neighboring wireless stations, a reciprocating service group;
   receive, during a discovery window of the reciprocating service group, a publishing frame for the service instance from at least one of the one or more neighboring wireless stations; and
   cancel publishing the service instance in the discovery window.

2. The wireless station of claim 1,
   wherein to publish the service instance, the at least one processor is further configured to cause the wireless station to:
   broadcast a multicast address and a service window.

3. The wireless station of claim 2,
   wherein the service window is defined by one or more of a time parameter and a channel parameter.

4. The wireless station of claim 1,
   wherein to discover the one or more neighboring wireless stations, the at least one processor is further configured to cause the wireless station to:
   determine that one or more neighboring wireless stations are publishing the service instance in a discovery window.

5. The wireless station of claim 1,
   wherein to form the reciprocating service group, the at least one processor is further configured to cause the wireless station to:
   republish the service instance in a service window; and
   establish session connections with the one or more neighboring wireless stations.

6. The wireless station of claim 1,
   wherein the at least one processor is further configured to cause the wireless station to:
   transmit active subscription frames during service windows to subscribe to existing service providers within the reciprocating service group.

7. The wireless station of claim 1,
   wherein the publishing service instance is cancelled in response to receiving the publishing frame.

8. The wireless station of claim 1,
   wherein the at least one processor is further configured to cause the wireless station to:
   compare received signal strength of the publishing frame to a threshold; and wherein the publishing service instance is cancelled in response to determining that the received signal strength is above the threshold.

9. An apparatus, comprising:
at least one non-transitory memory medium; and
at least one processor coupled to the at least one non-transitory memory medium, wherein the at least one processor is configured to:
publish a service instance;
discover one or more neighboring wireless stations publishing the service instance;
form, with the one or more neighboring wireless stations, a reciprocating service group;
receive, during a discovery window of the reciprocating service group, a publishing frame for the service instance from at least one of the one or more neighboring wireless stations; and
cancel publishing the service instance in the discovery window.

10. The apparatus of claim 9,
wherein to publish the service instance, the at least one processor is further configured to:
broadcast a multicast address and a service window.

11. The apparatus of claim 10,
wherein the service window is defined by one or more of a time parameter and a channel parameter.

12. The apparatus of claim 9,
wherein to discover the one or more neighboring wireless stations, the at least one processor is further configured to:
determine that one or more neighboring wireless stations are publishing the service instance in a discovery window.

13. The apparatus of claim 9,
wherein to form the reciprocating service group, the at least one processor is further configured to:
republish the service instance in a service window; and
establish session connections with the one or more neighboring wireless stations.

14. The apparatus of claim 9,
wherein the at least one processor is further configured to:
transmit active subscription frames during service windows to subscribe to existing service providers within the reciprocating service group.

15. The apparatus of claim 9,
wherein the publishing service instances is cancelled in response to receiving the publishing frame.

16. The apparatus of claim 9,
wherein the at least one processor is further configured to:
compare received signal strength of the publishing frame to a threshold; and
wherein the publishing service instance is cancelled in response to determining that the received signal strength is above the threshold.

17. A non-transitory computer readable memory medium storing program instructions executable by processing circuitry to cause a wireless station to:
publish a service instance;
discover one or more neighboring wireless stations publishing the service instance; and
form, with the one or more neighboring wireless stations, a reciprocating service group;
receive, during a discovery window of the reciprocating service group, a publishing frame for the service instance from at least one of the one or more neighboring wireless stations; and
cancel publishing the service instance in the discovery window.

18. The non-transitory computer readable memory medium of claim 17,
wherein the program instructions are further executable to:
broadcast, to the one or more neighboring wireless stations participating in a reciprocating service group, multicast session parameters including a multicast schedule; and
transmit, to a subset of the one or more neighboring wireless stations, multicast data according to the multicast schedule.

19. The non-transitory computer readable memory medium of claim 18,
wherein the multicast session parameters further include one or more of:
a multicast type;
a multicast address, wherein the multicast address is different than an address for the reciprocating service group; or
a multicast security policy, wherein the multicast security policy is different than a security policy for the reciprocating service group; and
wherein the multicast schedule specifies a channel and time window sequence for transmission of the multicast data.

20. The non-transitory computer readable memory medium of claim 18,
wherein the program instructions are further executable to:
adjust the multicast schedule based on preferences of the subset of the one or more neighboring wireless stations.

* * * * *